United States Patent [19]

Bates

[11] 4,019,076
[45] Apr. 19, 1977

[54] ELECTRICAL COMMUTATORS AND SLIP-RINGS

[75] Inventor: James John Bates, Shrivenham, England

[73] Assignee: National Research Development Corporation, London, England

[22] Filed: Jan. 8, 1975

[21] Appl. No.: 539,387

[30] Foreign Application Priority Data

Jan. 11, 1974 United Kingdom .............. 1328/74

[52] U.S. Cl. .............................. 310/233; 310/232
[51] Int. Cl.$^2$ ....................................... H02K 13/04
[58] Field of Search ............... 310/232–238, 310/219–222, 229, 230, 231

[56] References Cited

UNITED STATES PATENTS

| | | | |
|---|---|---|---|
| 2,297,521 | 9/1942 | Zadnik | 310/236 |
| 2,306,028 | 12/1942 | Conradty | 310/236 |
| 2,672,564 | 3/1954 | Krasno | 310/236 |
| 2,758,229 | 8/1956 | Perry | 310/233 |
| 3,657,584 | 4/1972 | Vartanian | 310/232 |

*Primary Examiner*—R. Skudy
*Attorney, Agent, or Firm*—Cushman, Darby & Cushman

[57] ABSTRACT

A commutator or slip-ring has a contact face formed of at least two dissimilar electrically conductive materials which have different values of electrical resistance. The two materials each occupy different discrete areas with a brush bearing on both areas simultaneously.

According to a further feature a commutator comprises pairs of segments of alternately high resistance and low resistance mounted in a machine which is arranged to rotate so that brushes bear firstly on a low resistance segment and then on a high resistance segment.

12 Claims, 8 Drawing Figures

ELECTRICAL COMMUTATORS AND SLIP-RINGS

This invention relates to sliding electrical contact members, especially commutators and slip-rings of the kind used in dynamoelectric machines and is concerned to provide a commutator or slip-ring paticularly but not exclusively for use with electrical brushes formed of carbon fibres.

The contact resistance between carbon fibres and different electrical conductors varies very widely and futhermore the contact resistance with a particular material may depend on the direction of flow of current, that is to say whether the electrical current is flowing from the fibres to that material or vice versa.

Accordingly the present invention provides a sliding electrical contact member having a contact face formed of at least two dissimilar electrically conductive materials which have different values of electrical resistance.

Thus for example the contact resistance between carbon fibres and copper or brass is high at a negative brush and lower at a positive brush. The contact resistance of tin is opposite to this. Accordingly if an electrical commutator has its surface formed half of copper and half of tin there will be a lower overall resistance as the positive brush will conduct mainly to the copper and the negative brush mainly to the tin.

It is also possible to design a commutator to make use of the high resistance property of certain contact materials to improve commutation. Thus a commutator embodying the invention can be constructed of pairs of segments connected together, the individual segments of a pair having alternately low contact resistance and high contact resistance and the segments positioned to enable a brush to contact the individual segments of a pair in sequence.

In operation it is arranged that the trailing edge of a carbon fibre brush makes contact with a high resistance segment as the brush passes from one segment pair to the next thus enabling a greater rate of change of current to take place in a coil being commutated.

The invention is equally applicable to commutators of drumshaped configuration or disc-shaped configuration.

In order that the invention may be more fully understood reference will now be made to the accompanying drawings in which.

Figure 1:
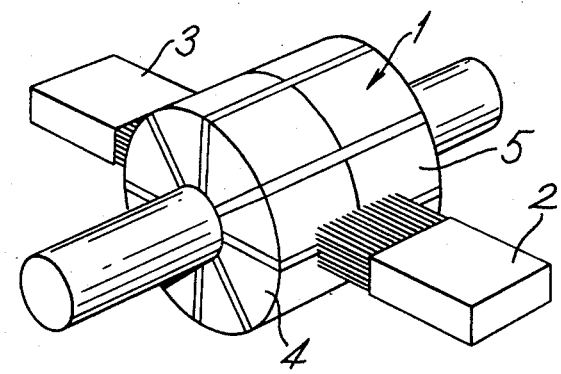
FIG. 1 and FIG. 2 show commutators embodying the invention of drum shape and disc shape respectively.

Referring now to FIG. 1 there is shown therein a drum-shaped commutator 1 having two carbon fibre brushes 2 and 3 making contact with the face thereof at opposite ends of a diametral line. Each segment of commutator 1 is constructed of two different metals, for example copper and tin. As shown in FIG. 1 the left-hand side 4 of the segments is constructed of, say, copper and the right-hand said 5 is constructed of tin.

Figure 2:
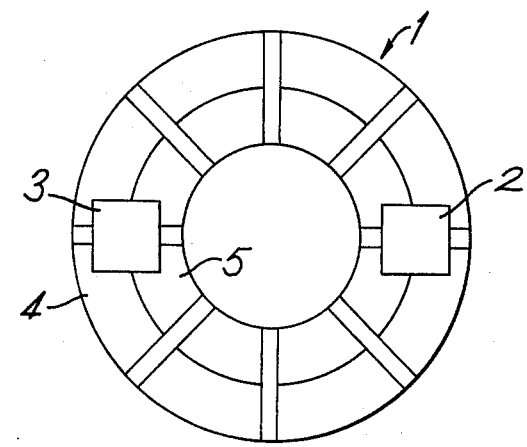

FIG. 2 shows a commutator which behaves in a similar manner to the commutator shown in FIG. 1 and like parts have like reference numerals except that instead of being drum-shaped it is disc-shaped and contact is made by the brushes bearing on the face of the disc.

While in FIG. 1 and FIG. 2 the two materials forming a commutator are shown as being limited to separate sides of a commutator it will be appreciated that such limitation is not essential. The different materials can be located in a series of bands for example which will be coaxial in a drum shape commutator and concentric in a disc-shaped commutator. In all cases however brushes 2 and 3 make continuous contact with the two different materials simultaneously. While the invention has been described above with reference to a commutator, it is equally applicable to slip-rings. Also solid carbon brushes can be used if desired.

Figure 3A:
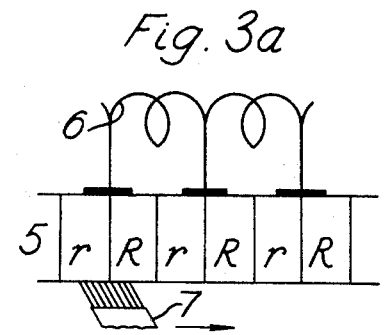
FIGS. 3a and 3b illustrate a commutator designed to improve commutation with a carbon fibre brush in successive positions.
Figure 3B:
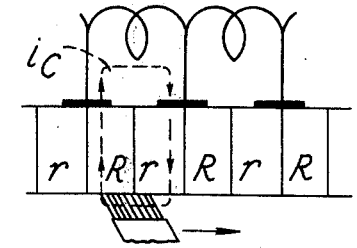

FIGS. 3a and 3b illustrate another embodiment of the invention which takes advantage of the varying electrical contact resistance of different materials. In the arrangement shown in these Figures a commutator 5 is constructed of a plurality of segment pairs connected together and alternate segments are formed of materials having low electrical resistance to a carbon fibre brush, such segments being indicated by r. The intermediate segments are formed of a different material chosen to have a high electrical resistance. These segments are indicated by R. Pairs of segments r and R are connected together and to tapping points taken to an armature winding 6. The segments of a pair are arranged so that when a brush 7 makes contact with a particular pair of segments the leading edge of a brush contacts the high resistance segment R while the trailing edge contacts the low resistance segment r. There is thus always a low contact resistance in parallel with a high contact resistance and thus the voltage drop between a brush and an armature tapping point is low. As the brush moves forward the leading edge of the brush makes contact with the low resistance segment of the next segment pair and contact is broken with the low resistance segment of the previous segment pair. Thus most of the electrical current now flows to the next tapping point of the commutator leaving a smaller current to be broken at the trailing edge of the brush which bears on the high resistance segment connected to the previous tapping point. This position of the brush is shown in FIG. 3b.

It will be seen that in the position of the brush shown in FIG. 3b and if the machine is an a.c. motor, there will be a transformer induced circulating current $i_c$ flowing in the armature coil being cmmutated. This circulatory path includes a high resistance segment R of a commutator pair and the circulating current is limited in magnitude thereby.

Figure 4:
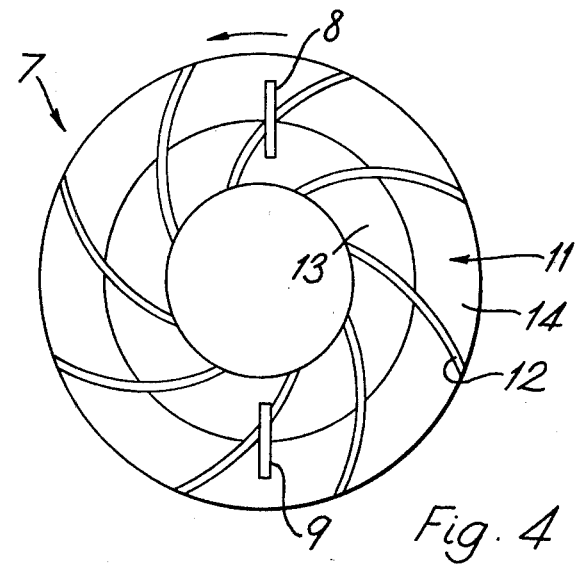
FIG. 4 shows a construction of a disc commutator corresponding to that shown in FIGS. 3a and 3b.

A practical construction for a commutator of the kind illustrated in FIGS. 3a and 3b is shown in FIG. 4 in the form of a disc-shaped commutator 7 having segment pairs 11 separated by insulation 12 of generally spiral configuration, each segment of a pair being formed of different materials corresponding to the materials of the commutator of FIGS. 3a and 3b and arranged with a low resistance segment 13 on the inside and high resistance segment 14 on the outside. As the commutator rotates it will be seen that the brushes 8 and 9 bearing thereon contact alternately a low resistance segment 13 and a high resistance segment 14 and move smoothly and progressively from one segment pair to the other.

Figure 5:
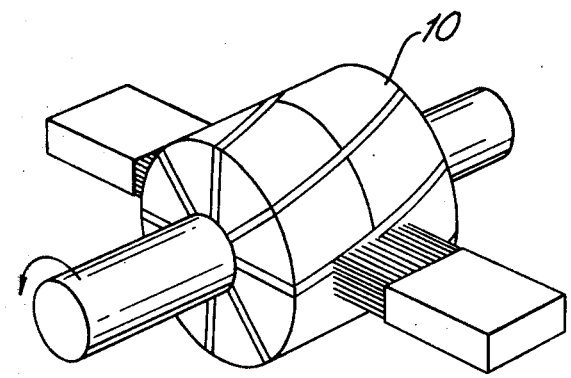
FIG. 5 shows a construction of a drum commutator corresponding to that shown in FIGS. 3a and 3b.

The construction shown in FIG. 4 can be modified to form a drum-shaped commutator 10 as in FIG. 5 in which case the segment pairs will be separated by insulation having a helical configuration. Materials suitable for the high resistance portions of the commutators of FIGS. 4 and 5 will depend on the voltage of the machine and the magnitude of the transformer induced voltage in the armature coil being commutated. Examples of suitable materials are zinc and aluminium.

The boundaries between the high resistance segment and the low resistance segment of a pair need not follow the configuration shown in FIGS. 4 and 5. In certain cases it may be desirable to modify the lines followed by the boundaries between the segment pairs in the manner shown in FIG. 6.

Figure 6:
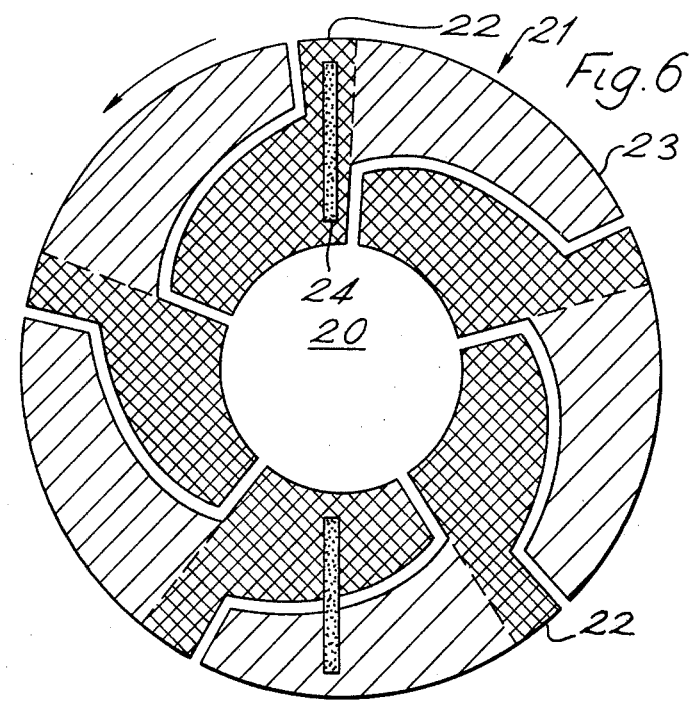
FIG. 6 shows an alternative construction of a disc commutator to that shown in FIG. 4.

A disc shape commutator 20 shown in FIG. 6 comprises a plurality of segment pairs 21. Each segment pair 21 comprising a low resistance segment 22 and a high resistance segment 23. Brushes 24 bear on commutator 20 and the direction of the commutator is such that a brush first makes contact with a low resistance segment 22 and thereafter the high resistance 23 of a segment pair. The boundaries between the pairs of segments are so shaped that there is a steady progressive increase in the proportion of brush 24 contacting a following segment and a corresponding progressive decrease in contact area as the brush leaves a leading segment. It will also be seen that during commutation a brush contacts the high resistace segment 23 of a leading segment pair and the low resistance segment 22 of a trailing pair. The segments are also shaped to ensure that despite the finite width of brushes 24 there is no possibility at any time of a brush being in contact with more than two segment pairs.

Figure 7:
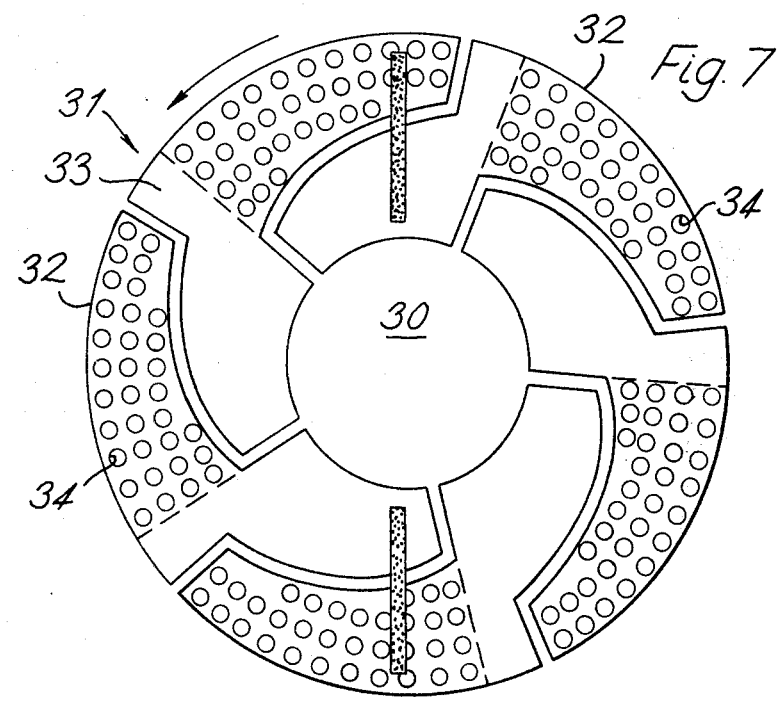
FIG. 7 shows yet another alternative construction of a disc commutator.

The segments 22 and 23 are formed of suitable materials that have different values of resistance. Alternatively as shown in FIG. 7, in a commutator 30 similar to that of FIG. 6, having segment pairs 31 comprising high resistance segments 32 and low resistance segments 33 the high resistance property of segment 32 is obtained by providing distributed holes 34 over the surface of segment 32. Segments 32 and 33 can be formed of a similar material in which case the higher resistance of segment 32 is due wholly to the holes 34 or else segment 32 can be formed of a higher resistance material to segment 33.

Surfaces such as that of segment 32 can be readily formed by well known etching techniques used in the production of printed circuit boards. Holes 34 need not, of course, be of circular shape nor need they be uniformly distributed over the surface of a segment.

While disc-shaped commutators have been shown in FIG. 6 and FIG. 7 it is equally possible to adapt the arrangements shown in these Figures to drum-shaped commutators.

I claim:
1. An electrical machine including a commutator and electrical contact brushes bearing thereon, said commutator being movable with respect to the brushes and comprising a plurality of pairs of interconnected segments, said pairs being separated from one another by electrical insulation and individual segments of a pair having alternately low contact resistance and high contact resistance, said segments being positioned to enable the brush to contact the individual segments of a pair in sequence whereby the brush first contacts a low resistance segment and then a high resistance segment.

2. A sliding electrical contact member having a contact face formed of at least two dissimilar electrically conductive materials which have different values of electrical resistance each of which materials occupies a different discrete area of the contact face.

3. The contact member as claimed in claim 1 in which the two materials have different values of electrical resistance depending on the direction of flow of current between the contact face and a carbon fibre brush.

4. The contact member as claimed in claim 1 in which the two materials are positioned on the contact face to enable a brush to maintain continuous contact with both materials simultaneously.

5. The contact member as claimed in claim 3 in which one of the materials is selected from the group comprising copper and brass.

6. The contact member as claimed in claim 5 in which the other of the materials comprises tin.

7. An electrical machine including a sliding electrical contact member as claimed in claim 2 and carbon fibre brushes bearing thereon.

8. An electrical commutator comprising pairs of segments connected together, the individual segments of a pair having alternately low contact resistance and high contact resistance and the segments positioned to enable a brush to contact the individual segments of a pair in sequence.

9. The commutator as claimed in claim 8 in which the segments of a pair are formed of two dissimilar materials which have different values of electrical contact resistance.

10. The commutator as claimed in claim 8, in which the high contact resistance segments include areas of insulation within the segments whereby to provide an overall high contact resistance to a brush when bearing thereon.

11. The commutator as claimed in claim 8 in which the segments are shaped to enable a brush to progressively transfer contact from one segment of a pair to the other when the commutator rotates.

12. The commutator as claimed in claim 11 in which the segments are shaped to prevent a brush contacting more than two segments simultaneously.

* * * * *